May 6 1969 E. A. SALERA 3,443,160

ELECTRONIC MODULE ASSEMBLY AND CONNECTOR MEANS THEREFOR

Filed March 10, 1966

INVENTOR.
Edmond A. Salera
BY
Warren D. Hill
ATTORNEY

United States Patent Office 3,443,16

Patented May 6, 196

3,443,160
ELECTRONIC MODULE ASSEMBLY AND CONNECTOR MEANS THEREFOR

Edmond A. Salera, Santa Barbara, Calif., assignor to General Motors Corporation, Detroit, Mich., a corporation of Delaware Filed Mar. 10, 1966, Ser. No. 533,295
Int. Cl. H02b *1/04*
U.S. Cl. 317—101 7 Claims

ABSTRACT OF THE DISCLOSURE

Terminal connectors are provided for an electronic module having spaced circuit boards. The connector includes a ribbon-like conductor extending through aligned apertures in the circuit boards. The conductor ends selectively make a contact with circuit conductors. A terminal pin is welded to the ribbon-like conductors at a point between the circuit boards and extends outwardly of the circuit board peripheries.

This invention relates to an electronic module assembly and connector means therefor and, more particularly, to an electronic module assembly for microcircuit sub-modules and plug-in electrical connectors therefor.

It is proposed by this invention to provide a means of packaging a plurality of electrical components in a module having high component density and a high degree of compactness. It is further proposed to provide a plug-in capability for the module by means of electrical connectors which may easily be accurately positioned during assembly and which have maximum resistance to plug-in and pull-out pressures.

The invention is carried out by providing an electrical connector having a ribbon-like base portion and an elongated connector portion secured thereto intermediate the ends thereof. The invention is further carried out by providing a pair of spaced circuit boards having apertures for receiving the ends of the base portion of the above-described connector so that the connector portion of the electrical connector lies between the circuit boards. It is contemplated that the base portions of the connectors will engage circuit conductors on the surface of the circuit boards. It is further contemplated that electrical components will be located between the circuit boards and will have their leads connected to the electrical circuitry in a manner similar to the way in which the electrical connectors are connected to the circuitry.

The above and other advantages of the invention will become more apparent with reference to the following specification taken in conjunction with the accompanying drawings wherein like numerals refer to like parts, and wherein.

Figure 1:
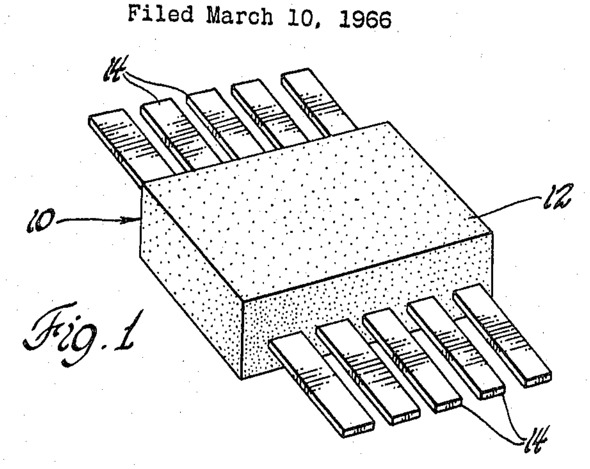
FIGURE 1 is a perspective view of a microcircuit module.

FIGURE 1 illustrates a type of electrical component 10 known as a microcircuit module and commonly referred to as a flat-pack. The microcircuit module is comprised of miniature circuitry encapsulated within a rectangular block of insulating material 12 and having a plurality of flat ribbon leads 14 extending from opposite sides thereof. These microcircuit modules do not form a part of this invention, but are readily incorporated into the structu terminals for the module assembly are achieved by unique electrical connector construction. As best seen i FIGURE 3 an electrical connector 32 is formed by pro viding an elongated ribbon-like metallic base portion 3 and securing a second elongated ribbon-like member 3 at right angles thereto intermediate the ends of the bas portion. The second member 36 forms the connector por tion or terminal pin 36. In order to assure compatibilit between the materials of the printed circuitry and the ex ternal circuitry engaged by the terminal pins, the bas portion 34 and connector portion 36 of the connector 3 may be made of different metallic compositions.

Figure 4:
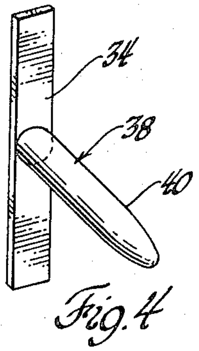
FIGURES 3 and 4 are perspective views of electrical connectors of FIGURE 2.
Figure 3:
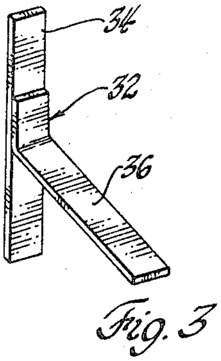

FIGURE 4 illustrates an alternative electrical connecto structure 38 which is, in principle, the same as that o FIGURE 3 except that the connector portion 40 is of familiar cylindrical bullet-shaped form of terminal pin whereas that of FIGURE 3 is blade shaped. In both struc tures the connector portion is secured intermediate th ends of a ribbon-like base strip 34 at right angles theret by any desired means, such as welding.

Figure 5:
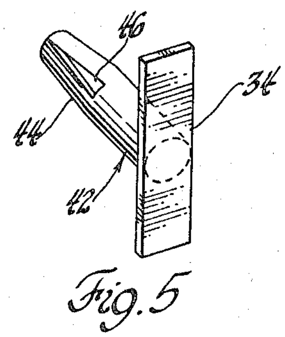
FIGURE 5 is a perspective view of another electrical connector according to the invention.

Should it be desired to provide female terminal connec tors in the module assembly, instead of the male terminal as described above, the structure of FIGURE 5 may b used. The female terminal connector 42 is formed b providing a ribbon-like base portion 34 having a tubula connector portion 44 welded intermediate the ends there of at right angles thereto. The free end of the tubular con nector portion is bifurcated by means of a slot 46 an of this invention and typify one type of electrical compo nent which may be used in the structure of FIGURE 2

Figure 2:
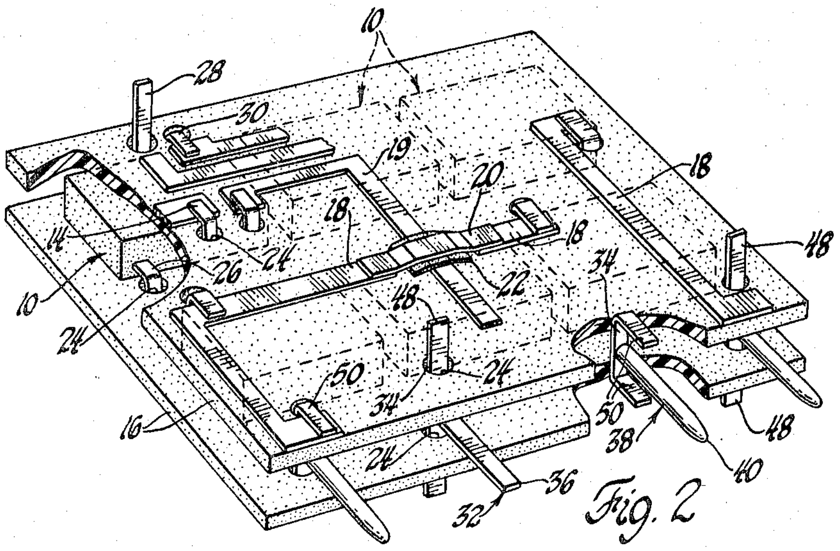
FIGURE 2 is a partly broken away perspective view of an electronic module assembly which incorporates several of the modules of FIGURE 1 and which incorporates electrical connectors according to the invention.

FIGURE 2 illustrates a partially completed electroni module assembly which comprises a plurality of micro circuit modules 10 such as those of FIGURE 1 sand wiched between a pair of spaced printed circuit board 16. Conductors 18, 19 on the outer surface of the circui boards form a part of the circuit board 16 and may be formed thereon by any conventional means, such as etch ing. Cross-over means for conductors is provided by a jumper strip 20 interconnecting two "printed" conductors 18 and separated from an underlying conductor 19 by an insulating pad 22. Apertures 24 in the circuit boards at predetermined locations permit the leads 14 of the micro circuit modules 10 to extend through either of the circuit boards 16 according to a predetermined plan. A right-angle bend as at 26 in the leads 14 of the component made prior to assembly allows each lead 14 to pass through its respective circuit board aperture 24 during assembly as indicated at 28. After the circuit boards 16 are located in place over and under the mircrocircuit modules 10, the module leads 14 are crimped into engagement with circuit conductors by making an additional right-angle bend as at 30 in each lead. Thus, electrical connections are made between the component leads 14 and the conductors 18 and, in addition, the assembly is mechanically held together by the several bent-over leads. The electrical connections are perfected by welding or soldering. Plug-in the bifurcated portions are bent together so as to form a resilient receptacle for engaging a terminal pin. Specifically, the structure of FIGURE 5 can be used in a receptacle member which receives the terminal pins of the module assembly.

With reference again to FIGURE 2, the terminal connectors 32, 38 are assembled to the module assembly at the same time the microcircuit modules 10 are assembled thereto by passing the ends of the base portion 34 of each electrical connector through pre-formed apertures 24 near one side of the circuit boards as shown at 48. The ends of each base portion are crimped into engagement with the circuit board as at 50 so as to contact a circuit conductor 18 on at least one of the circuit boards 16 and the connection is perfected by welding or soldering.

t should be noted that the construction of the electrical onnector 32, 38 is such that the connector portion or in 36, 40, 44 can be accurately located between the cir- uit boards 16 prior to crimping the ends of the base por- ion 34, thus facilitating easy assembly thereof. It is con- emplated that the entire assembly will be encapsulated n insulating material, not shown, except that, of course, in he case where male terminal pins 36, 40 are used these vill project outside the encapsulating material. Prior to ncapsulation, however, it will be seen that, due to the esiliency of the ribbon-like base portions, final alignment f the pins 36, 40 may be made, if required, by bending hem slightly. Only very slight bending will be necessary; owever, due to the facility of locating the terminal pins luring initial assembly. The electrical connectors of FIG- JRES 3, 4 and 5 may be used interchangeably. How- ver, ordinarily, any particular assembly will have only ne type of electrical connector.

It can readily be seen that the terminal pin construction n the presence of encapsulating material, according to his invention, provides maximum pull-out and push-in esistance, thereby preventing internal damage to the nodule assembly during plugging operations.

It is to be understood that this description is illustra- ive of the preferred embodiment of the invention and the cope of the invention is to be limited only by the follow- ng claims.

I claim:

1. An electronic module assembly having a pair of paced circuit boards including circuit conductors, aper- ures in said boards, at least some of the apertures in each board being aligned with corresponding apertures in he other board to form pairs of aligned apertures, a plu- ality of electrical conductors each comprising an elon- gated base portion extending through a pair of aligned apertures in the boards, and each connector including a terminal portion attached to the base portion at a point between the circuit boards, the terminal portion extending outwardly of the peripheries of the circuit boards.

2. In an electronic module assembly as defined in claim 1 including electrical components between the circuit boards having leads extending through the apertures and making contact with the circuit conductors.

3. An electronic module assembly as defined in claim 1 wherein the terminal portion is attached at right angles to the base portion intermediate the ends thereof.

4. An electronic module assembly as defined in claim 3 wherein the base portion comprises a metallic ribbon.

5. An electronic module assembly as defined in claim 4 wherein the terminal portion is a flat blade-like member.

6. An electronic module assembly as defined in claim 4 wherein the terminal portion is a generally cylindrical member.

7. An electronic module assembly as defined in claim 4 wherein the ends of the base portion are bent into engagement with the circuit board surfaces and at least one of the ends contacts a circuit conductor.

References Cited

UNITED STATES PATENTS

| | | | |
|---|---|---|---|
| 2,093,261 | 9/1937 | Willson | 85—28 XR |
| 2,351,993 | 6/1944 | Miles et al. | 85—37 XR |
| 3,175,127 | 3/1965 | Knox-Seith | 317—101 |
| 2,740,097 | 3/1956 | Edelman et al. | |
| 3,316,453 | 4/1967 | Lassers. | |

DARRELL L. CLAY, *Primary Examiner.*

U.S. Cl. X.R.

29—626; 85—37; 174—68.5; 339—17, 220

UNITED STATES PATENT OFFICE
CERTIFICATE OF CORRECTION

Patent No. 3,443,160 May 6, 1969

Edmond A. Salera

It is certified that error appears in the above identified patent and that said Letters Patent are hereby corrected as shown below:

Column 2, line 2, beginning with "terminals for" cancel all to and including "slot 46 and" in line 29, and insert the same after "Plug-in" in line 57, same column 2.

Signed and sealed this 21st day of April 1970.

(SEAL)
Attest:

Edward M. Fletcher, Jr.
Attesting Officer

WILLIAM E. SCHUYLER, JR.
Commissioner of Patents